United States Patent
Atokawa et al.

(10) Patent No.: US 6,697,605 B1
(45) Date of Patent: Feb. 24, 2004

(54) HIGH-FREQUENCY CIRCUIT APPARATUS AND COMMUNICATION APPARATUS

(75) Inventors: Masayuki Atokawa, Kanazawa (JP); Toshihiro Yamamoto, Komatsu (JP)

(73) Assignee: Murata Manufacturing Co. Ltd. (JP)

( * ) Notice: Subject to any disclaimer, the term of this patent is extended or adjusted under 35 U.S.C. 154(b) by 299 days.

(21) Appl. No.: 09/591,272

(22) Filed: Jun. 9, 2000

(30) Foreign Application Priority Data

Jun. 9, 1999 (JP) ............................................ 11-162894

(51) Int. Cl.[7] .................................................. H04B 1/46
(52) U.S. Cl. .............................. 455/82; 455/78; 455/83; 333/126
(58) Field of Search .............................. 455/73, 74, 78, 455/82, 83, 84, 574, 129, 343, 552; 333/104, 103, 132, 126, 129, 134

(56) References Cited

U.S. PATENT DOCUMENTS

| | | | |
|---|---|---|---|
| 5,023,935 A | * | 6/1991 | Vancraeynest ................ 455/80 |
| 5,486,797 A | * | 1/1996 | Suzuki ......................... 333/104 |
| 5,550,895 A | * | 8/1996 | Burson et al. ................ 455/552 |
| 5,634,200 A | * | 5/1997 | Kitakubo et al. ............. 455/82 |
| 5,689,817 A | * | 11/1997 | Fok .............................. 455/79 |
| 5,701,594 A | * | 12/1997 | Bath et al. .................... 455/78 |
| 5,768,691 A | * | 6/1998 | Matero et al. ................ 455/78 |
| 5,890,056 A | * | 3/1999 | Garner et al. ............. 455/67.11 |
| 5,915,212 A | * | 6/1999 | Przelomiec et al. .......... 455/83 |
| 6,107,960 A | * | 8/2000 | Krasner .................. 342/357.09 |
| 6,288,620 B1 | * | 9/2001 | Atokawa et al. ............ 333/103 |
| 6,381,446 B1 | * | 4/2002 | Meixner ....................... 455/82 |
| 6,414,566 B1 | * | 7/2002 | Atokawa .................... 333/134 |

FOREIGN PATENT DOCUMENTS

WO       WO 92/00634 A1 * 1/1992

OTHER PUBLICATIONS

Korean Office Action dated May 29, 2002 (w/ Japanese translation).

* cited by examiner

*Primary Examiner*—Charles Appiah
(74) *Attorney, Agent, or Firm*—Dickstein, Shapiro, Morin & Oshinsky, LLP.

(57) ABSTRACT

Provided is a high-frequency circuit apparatus and a communication apparatus whose consumption current is small and the inserting loss is small. One embodiment provides a high-frequency circuit apparatus constructed by an antenna duplexer of a frequency variable type; a first change-over switch which is electrically connected to an antenna terminal in the antenna duplexer; a second change-over switch which is electrically connected to a receiving terminal in the antenna duplexer; and a filter for reception which is electrically connected across the first and second change-over switches. As for the first and second change-over switches, a GaAs switch and a PIN diode switch, etc. are used. As for the filter for reception, a surface acoustic wave filter or monolithic ceramic LC filter, etc. is used.

6 Claims, 9 Drawing Sheets

FIG. 13
PRIOR ART

HIGH-FREQUENCY CIRCUIT APPARATUS AND COMMUNICATION APPARATUS

BACKGROUND OF THE INVENTION

1. Field of the Invention

The present invention relates to a hiqh-frequency circuit apparatus and a communication apparatus used for, e.g., a microwave band.

2. Description of the Related Art

For instance, a transmitting frequency band of 1850 to 1910 MHz is required for a transmitting side circuit of an antenna duplexer used for a PCS, a receiving frequency band of 1930 to 1990 MHz is required for a receiving side circuit. Both of transmitting side and receiving side circuits need to have a wide passing band of 60 MHz. Separation of 20 MHz is assured to separate the transmitting frequency band and receiving frequency band, and the separation between them is extremely small.

The antenna duplexer synthesizes a phase of the transmitting side circuit with a phase of the receiving side circuit. In case of the PCS, the transmitting side circuit is set to have a high impedance of the receiving frequency band of 1930 to 1990 MHz (become open), and the receiving side circuit is set to have a high impedance of the transmitting frequency band of 1850 to 1910 MHz (become open). Accordingly, the phase of the transmitting side circuit is synthesized with that of the receiving side circuit desirably.

Figure 8:
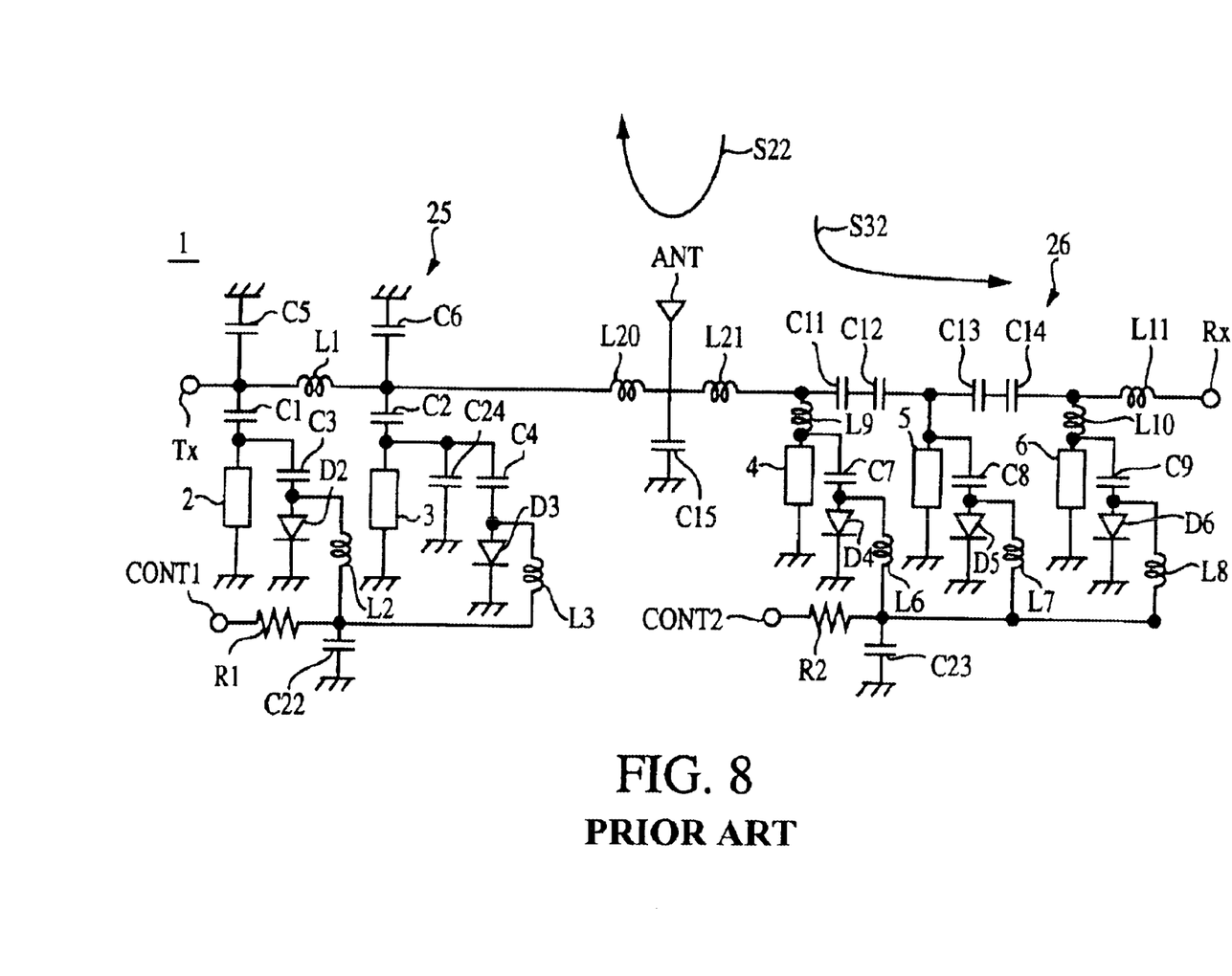
FIG. 8 is an electric circuit diagram showing a construction of an antenna duplexer of a frequency variable type.
Figure 9:
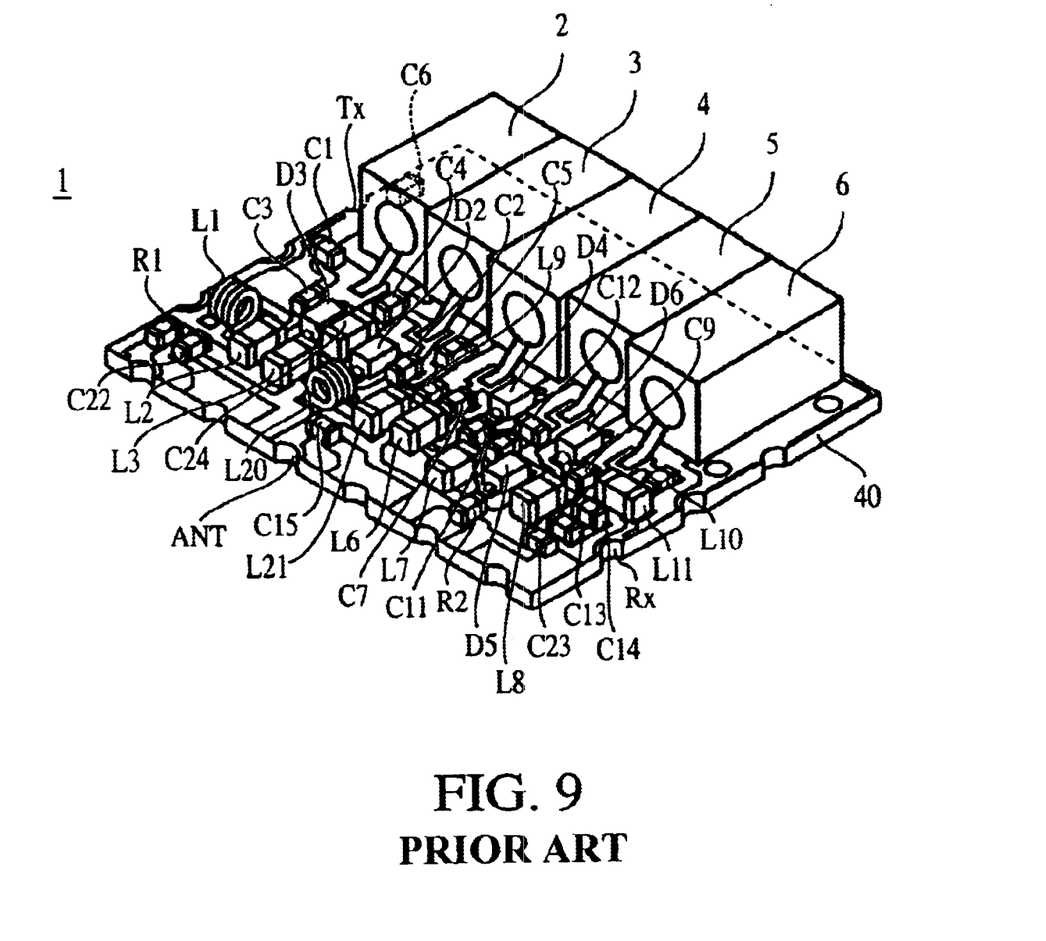
FIG. 9 is a perspective view showing a mounting structure of the antenna duplexer shown in FIG. 8.

FIG. 8 shows a circuit construction example of an antenna duplexer 1, and FIG. 9 is a perspective view of the antenna duplexer 1 where parts are mounted on a circuit board 40. In case of the PCS system, the antenna duplexer 1 has narrow separation between the transmitting frequency band and the receiving frequency band of 20 MHz, so that the transmitting frequency band is divided into two bands, i.e., a band of 1850 to 1880 MHz and a band of 1880 to 1910 MHz, the receiving frequency band is divided into two bands, i.e., a band of 1930 to 1960 MHz and a band of 1960 to 1990 MHz, and thus the passing band is made narrow and the separation is made wide. That is, a reactance element (PIN diode) capable of controlling a voltage is connected to a resonator, and the reactance element and resonator are voltage-controlled. Consequently, it is possible to switch the two kinds of passing bands which a transmitting side circuit 25 and a receiving side circuit 26 have, respectively, and the number of filter stages is reduced to have a small size and high characteristics.

Referring to FIGS. 8 and 9, Tx denotes a transmitting terminal; Rx a receiving terminal; ANT an antenna terminal; 2 and 3 resonators of the transmitting side circuit 25; 4 to 6 resonators of the receiving side circuit 26; L1 and L11 coupling coils; C1 and C2 coupling capacitors which decide the magnitude of a blocking band attenuation amount; L9 and L10 inductances for resonance; C5, C6, and C24 capacitors; C3, C4, and C7 to C9 capacitors for variable frequency band; D2 to D6 PIN diodes; L2, L3, and L6 to L8 choke coils; R1, R2, C22, and C23 resistors and capacitors for supplying a control voltage; L20, L21, C15 coils and capacitors comprising phase circuits; and C11 to C14 coupling capacitors. Dielectric resonators are used for the resonators 2 to 6.

The antenna duplexer 1 outputs a transmitting signal, which is inputted from a transmitting circuit system to the transmitting terminal Tx, from the antenna terminal ANT via the transmitting side circuit 25, and also outputs a receiving signal inputted from the antenna terminal ANT from the receiving terminal Rx to a receiving circuit system via the receiving side circuit 26.

Figure 10:
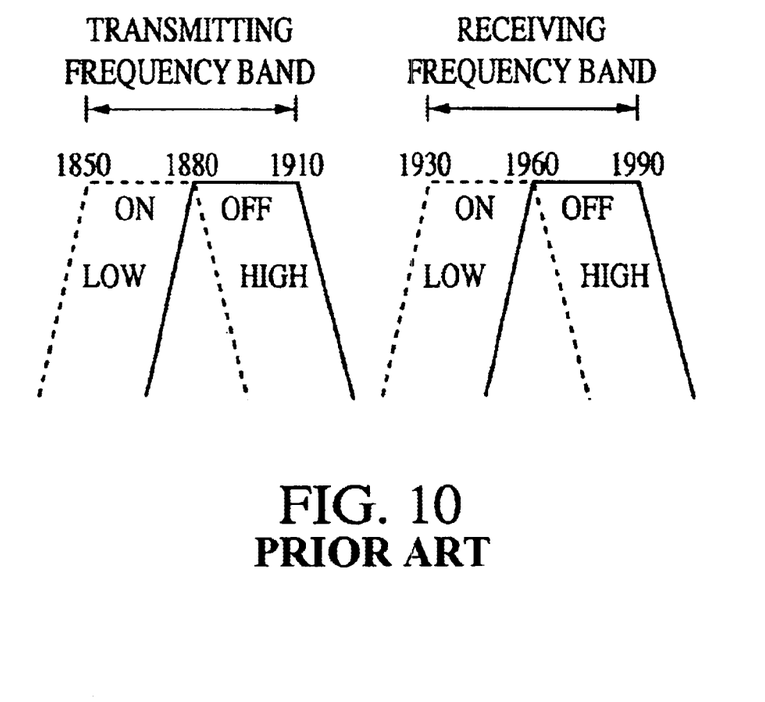
FIG. 10 is an explanatory diagram showing filter characteristics of the antenna duplexer.

CONT1 denotes a voltage control terminal for voltage-controlling the PIN diodes D2 and D3 in the transmitting side circuit 25; and CONT2 a voltage control terminal for voltage-controlling the PIN diodes D4 to D6 in the receiving side circuit 26. If applying a positive voltage to the voltage control terminals CONT1 and CONT2, the PIN diodes D2 to D6 are turned on, and the antenna duplexer 1 operates at a LOW channel. In other words, as shown in FIG. 10, the passing band of the transmitting side circuit 25 is set to 1850 to 1880 MHz, and that of the receiving side circuit 26 is set to 1930 to 1960 MHz. On the contrary, if setting the control voltage to 0V to prevent a voltage from being applied to the voltage control terminals CONT1 and CONT2, alternatively, applying a negative voltage to the voltage control terminals CONT1 and CONT2, the PIN diodes D2 to D6 are turned off and the antenna duplexer 1 operates at a HIGH channel. That is, as shown in FIG. 10, the passing band of the transmitting side circuit 25 is set to 1880 to 1910 MHz and that of the receiving side circuit 26 is set to 1960 to 1990 MHz.

A cellular phone is set to a standby mode of a receiving wave for time excluding communication time. If the frequency of the receiving wave standby mode is equal to 1930 MHz and the cellular phone then enters the receiving wave standby mode while applying the positive voltage to the voltage control terminals CONT1 and CONT2 in the antenna duplexer 1, there might be arisen problems such that a battery of the cellular phone is wasted fast and the receiving wave standby time becomes short.

Figure 11:
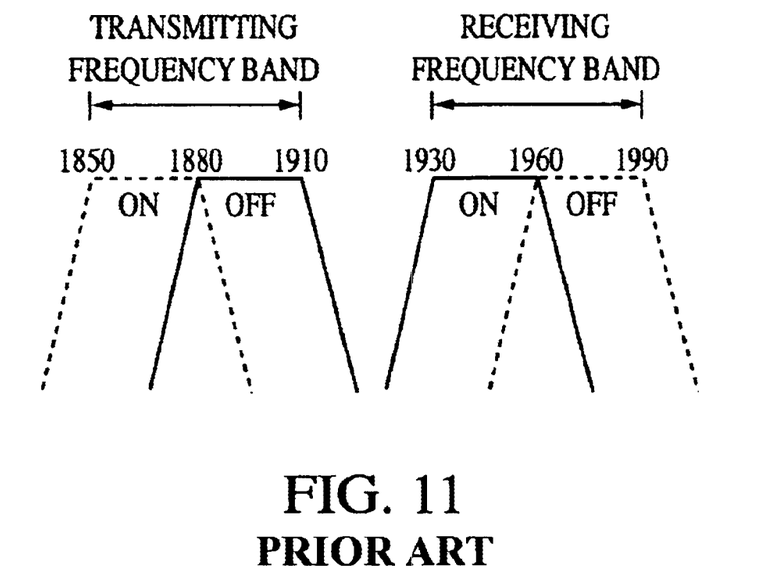
FIG. 11 is an explanatory diagram showing the filter characteristics of the antenna duplexer shown in FIG. 8.

With regard to the countermeasures against the foregoing, it is devised that the control voltage of the voltage control terminal CONT1 is set to 0V and the positive voltage is applied only to the voltage control terminal CONT2. Thereby, a consumption current flows only to the receiving side circuit 26 for receiving wave standby mode and thus it is able to suppress the waste of the battery. However, in a system, e.g., the PCS such that the transmitting frequency band has a frequency lower than that of the receiving frequency band, if turning off the PIN diodes D2 and D3 in the transmitting side circuit 25 and turning on the PIN diodes D4 to D6 in the receiving side circuit 26, as shown in FIG. 11, the separation is made extremely narrow between the passing band (1880 to 1910 MHz) in the transmitting side circuit 25 and the passing band (1930 to 1960 MHz) in the receiving side circuit 26. As a consequence, it is made difficult to set the transmitting side circuit 25 to have a high impedance (become open) at the receiving frequency band of 1930 to 1960 MHz, thereby arising a new problem to increase a loss for inserting the receiving side circuit 26.

Figure 12:
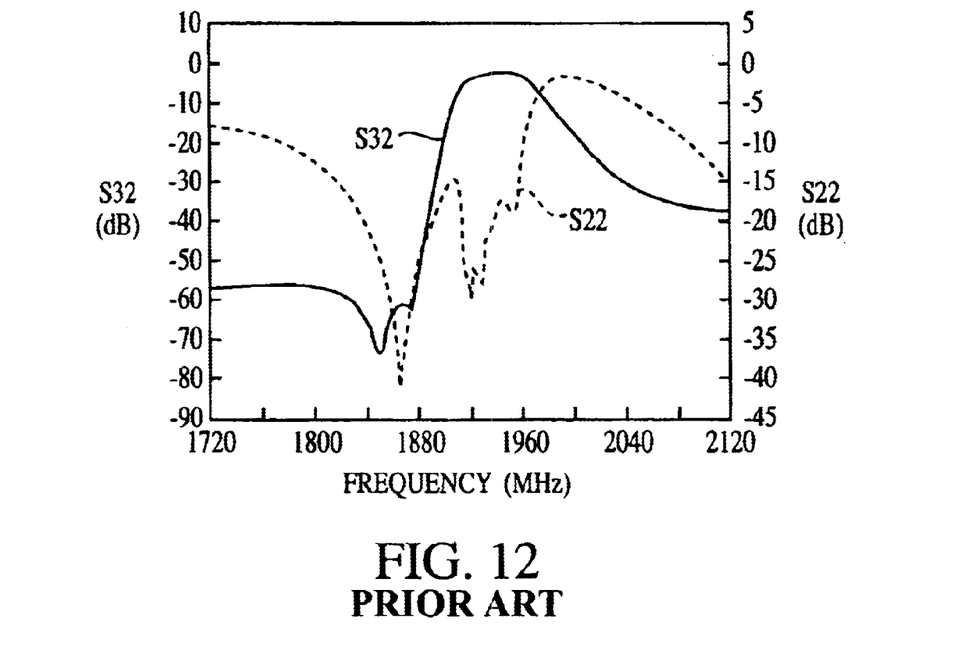
FIG. 12 is a graph showing passing and reflecting characteristics of a receiving side circuit, when applying a positive voltage to voltage control terminals CONT1 and CONT2 in the antenna duplexer shown in FIG. 8.
Figure 13:
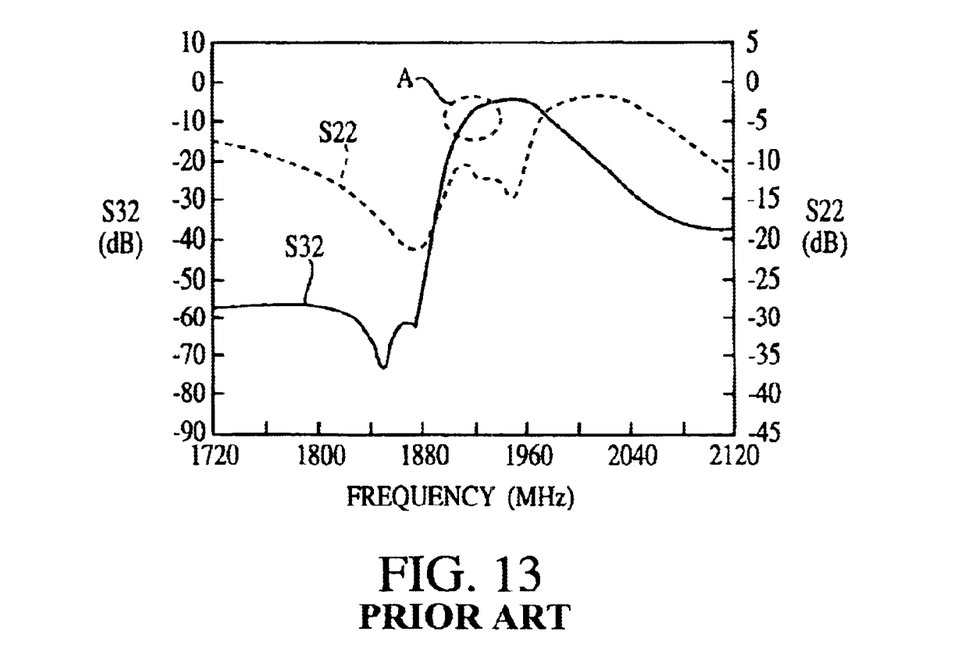
FIG. 13 is a graph showing passing and reflecting characteristics of the receiving side circuit, when applying the positive voltage only to the voltage control terminal CONT2 in the antenna duplexer shown in FIG. 8.

FIG. 12 is a graph showing a result to measure a passing characteristic S32 and a reflecting characteristic S22 of the receiving side circuit 26, when applying the positive voltage to the voltage control terminals CONT1 and CONT2 (refer to FIG. 8). In this figure, the loss for inserting the receiving side circuit 26 is equal to 3.3 dB. By contrast, FIG. 13 is a graph showing a result to measure the passing characteristic S32 and the reflecting characteristic S22 of the receiving side circuit 26, when applying the positive voltage only to the voltage control terminal CONT2. Referring to FIG. 13, a waveform distortion is caused at a portion indicated by a circle A. In this figure, the loss for inserting the receiving side circuit 26 deteriorates to 5.0 dB.

SUMMARY OF THE INVENTION

To overcome the above described problems, preferred embodiments of the present invention provide a high-frequency circuit apparatus and a communication apparatus having a small consumption current and a low inserting loss.

One preferred embodiment of the present invention provides a high-frequency circuit apparatus comprising:

an antenna duplexer of a frequency variable type having a first external terminal, a second external terminal, and an antenna terminal;

a first change-over switch which is electrically connected to the antenna terminal;

a second change-over switch which is electrically connected to the second external terminal; and a filter which is electrically connected across the first change-over switch and the second change-over switch. Herein, the first external terminal is, e.g., a transmitting terminal, the second external terminal is, e.g., a receiving terminal, and the filter is, e.g., a filter for reception.

In case of a receiving wave standby mode at a channel frequency band in which it is necessary to flow a consumption current to the antenna duplexer, the antenna duplexer is switched to the filter by first and second change-over switches, and the receiving wave is allowed to pass through the filter, not through the antenna duplexer. Accordingly, it is unnecessary to flow the consumption current to the antenna duplexer, thereby decreasing the amount of consumption current for the receiving wave standby mode.

As for the first and second change over switches, a GaAs switch and a PIN diode switch are used and thus the switch size is miniaturized and also the switching operation becomes fast. As for the filter, a surface acoustic wave filter, a coil, and a capacitor are combined and constructed thereby using the thus-obtained filter. Consequently, the filter is miniaturized.

Further, according to the present invention, there is provided a communication apparatus comprising any one of the high-frequency circuit apparatuses having the aforementioned features, and to thereby suppress the amount of consumption current for receiving wave standby mode and diminish the loss of the receiving side circuit.

DESCRIPTION OF THE PREFERRED EMBODIMENTS

The description turns to embodiments of a high-frequency circuit apparatus and a communication apparatus according to the present invention with reference to accompanied drawings hereinbelow.

[First embodiment; FIG. 1 to FIG. 4]

Figure 1:
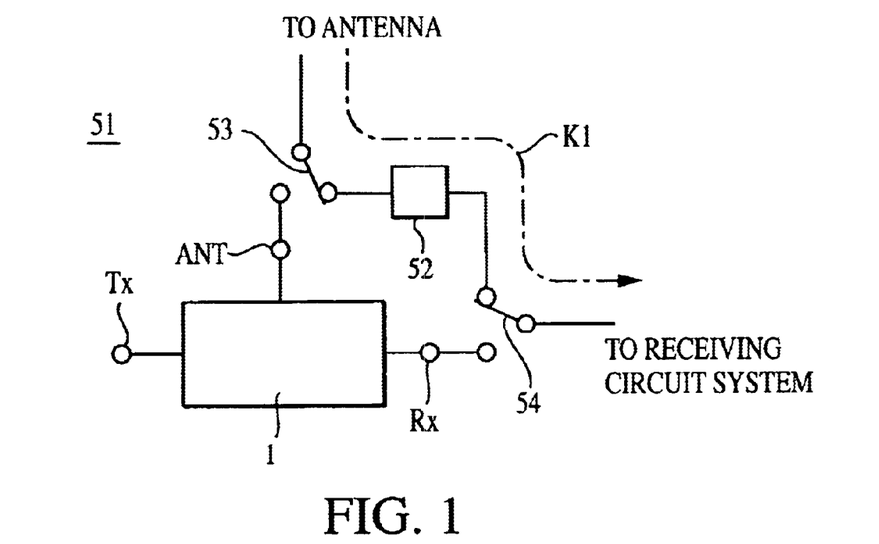
FIG. 1 is an electric circuit diagram showing a first embodiment of a high-frequency circuit apparatus according to the present invention.

FIG. 1 is a diagram showing a circuit construction of a high-frequency circuit apparatus 51 in a communication apparatus. The high-frequency circuit apparatus 51 comprises: an antenna duplexer 1 of a frequency variable type; a change-over switch 53 which is electrically connected to an antenna terminal ANT in the antenna duplexer 1; a change over switch 54 which is electrically connected to a receiving terminal Rx in the antenna duplexer 1; and a filter 52 for reception which is electrically connected across the change-over switches 53 and 54.

The antenna duplexer 1 of the frequency variable type is the same as the antenna duplexer of the frequency variable type as shown in FIGS. 8 and 9, and the detailed description is omitted. As for the change-over switches 53 and 54, a GaAs switch or the like is used. Thus, the change-over switches 53 and 54 has a small size and also execute the switching operation fast.

Figure 3:
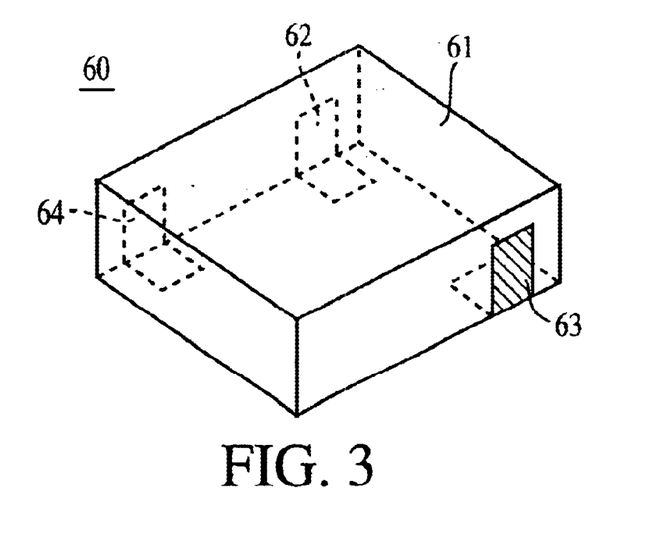
FIG. 3 is a perspective view showing a surface acoustic wave filter used for the high-frequency circuit apparatus shown in FIG. 1.

For example, a surface acoustic wave filter 60 is used for the filter 52 for reception, as shown in FIG. 3. The surface acoustic wave filter 60 comprises an input terminal 62, a ground terminal 64, and an output terminal 63 onto two facing side-surface portions of a rectangular case 61. A surface acoustic wave filter element (not shown) having an interdigital electrodes transducer is arranged in the case 61. In case of the PCS system, it is not necessary for the interdigital electrodes transducer to cover the all of the receiving frequency band (1930 to 1990 MHz), but it is sufficient to cover the passing band of the LOW channel (1930 to 1960 MHz). Therefore, an electrode finger pitch of the interdigital electrodes transducer can be wide and the surface acoustic wave filter element can be produced simply.

Figure 4:
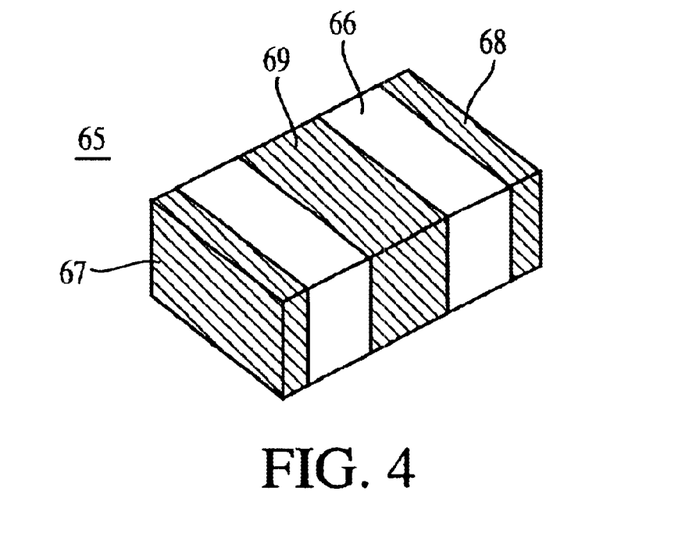
FIG. 4 is a perspective view showing another example of the filter used for the high-frequency circuit apparatus shown in FIG. 1.

As the performance of the filter 52 for reception, for instance, a monolithic ceramic LC filter 65 may be used as the filter 52 for reception if a large attenuation amount is not necessary in case of the receiving wave standby mode, as shown in FIG. 4. The monolithic ceramic LC filter 65 is constructed by forming an input terminal 67, an output terminal 68, and a ground terminal 69 onto a surface of a monolithic body 66 which is constructed by a monolithic insulative sheet, etc. obtained by forming a coil conductive pattern and a capacitor electrode pattern onto the surface. A coil constructed by the coil conductive pattern and a capacitor constructed by the capacitor electrode pattern (not shown in FIG. 4) are disposed in the monolithic body 66. The surface acoustic wave filter 60 and monolithic ceramic LC filter 65 are used as the filter 52 for reception, thereby miniaturizing the filter.

The next description turns to an operation and an advantage of the high-frequency circuit apparatus 51 with the above-stated construction.

It is assumed that the high-frequency circuit apparatus 51 waits for a receiving wave at a channel frequency band which requires supplying a consumption current to the antenna duplexer 1 of the frequency variable type, and waits for the receiving wave at the LOW channel (1930 to 1960 MHz), temporarily, in case of the PCS system. In this case, the change-over switches 53 and 54 are switched to the filter 52 for reception side, as shown in FIG. 1. As a result, the receiving wave received through the antenna passes through the filter 52 for reception, not through the antenna duplexer 1, as shown by an arrow K1. Therefore, it is made unnecessary to supply the consumption current to the antenna duplexer 1 and the amount of consumption current for receiving wave standby mode is reduced. Especially, if using the GaAs switches as the change-over switches 53 and 54, it is also unnecessary to supply the consumption current to the change-over switches 53 and 54 for receiving wave standby mode. Further, the filter 52 for reception is opened to the antenna duplexer 1 electrically, so that it is able to suppress the loss to insert the filter 52 for reception to a low level.

Figure 2:
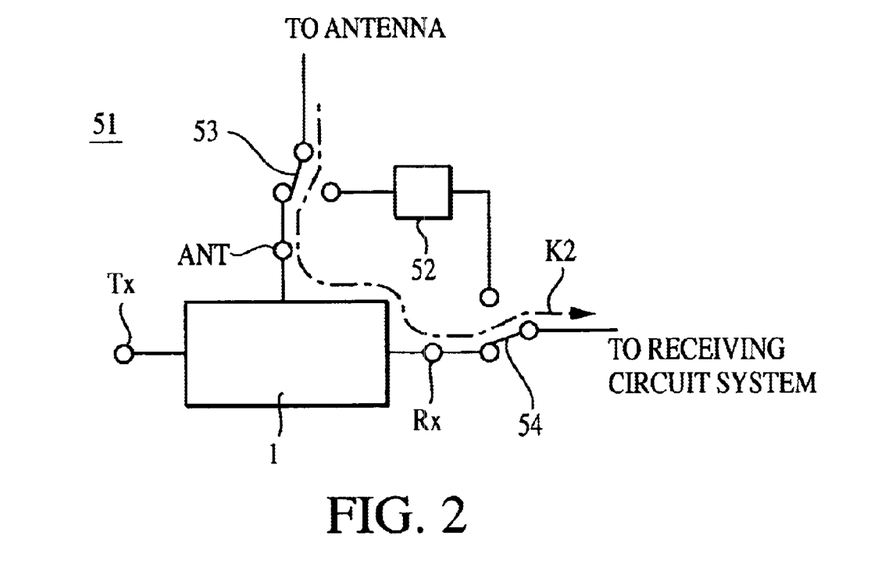
FIG. 2 is an electric circuit diagram for explaining the operation of the high-frequency circuit apparatus shown in FIG. 1.

On the other hand, it is assumed that the high-frequency circuit apparatus 51 waits for the receiving wave at a channel frequency band at which no consumption current is supplied to the antenna duplexer 1 of the frequency variable type, and waits for the receiving wave at the HIGH channel (1960 to 1990 MHZ) in case of the PCS system. In this case, the change-over switches 53 and 54 are switched to the antenna duplexer 1 side, as shown in FIG. 2. As a result, the receiving wave received through the antenna passes through the antenna duplexer 1, as shown by an arrow K2. Since no consumption current flows to the antenna duplexer 1, it is capable of suppressing the amount of consumption current for receiving wave standby mode. The PIN diodes D2 and D3 in the transmitting side circuit 25 in the antenna duplexer 1 are also OFF and further the PIN diodes D4 to D6 in the receiving side circuit 26 are OFF. This causes increased separation of 50 MHz between the passing band (1880 to 1910 MHz) in the transmitting side circuit 25 and the passing band (1960 to 1990 MHZ) in the receiving side circuit 26, as shown in FIG. 10. The transmitting side circuit 25 can be set to have a high impedance (become open) at the receiving frequency band 1960 to 1990 MHz and also the loss to insert the receiving side circuit 26 can be suppressed to a low level.

The change-over switches 53 and 54 are always set to a mode (shown in FIG. 2) which is switched to the antenna duplexer 1 during communication, and the antenna duplexer 1 operates in accordance with a high attenuation amount and a high power. The antenna duplexer 1 outputs a transmitting signal, which is inputted to the transmitting terminal Tx from a transmitting circuit system, from the antenna terminal ANT via the transmitting side circuit 25, and also outputs a receiving signal, which is inputted from the antenna terminal ANT, from the receiving terminal Rx via the receiving side circuitd 26 to the receiving circuit system. When the antenna duplexer 1 of the frequency variable type operates at the LOW channel, the PIN diodes D2 to D6 are turned on by applying the positive voltage to the voltage control terminals CONT1 and CONT2 in the antenna duplexer 1. Accordingly, the passing band of the transmitting side circuit 25 is set to be equal to 1850 to 1880 MHz and that of the receiving side circuit 26 is set to 1930 to 1960 MHz, as shown in FIG. 10. Contrarily, when the antenna duplexer 1 of the frequency variable type operates at the HIGH channel, the control voltage is set to 0V so as to prevent a voltage from being applied to the voltage control terminals CONT1 and CONT2 in the antenna duplexer 1, or the PIN diodes D2 to D6 are turned off by applying the negative voltage to the voltage control terminals CONT1 and CONT2. Thus, the passing band of the transmitting side circuit 25 is set to 1880 to 1910 MHz and that of the receiving side circuit 26 is set to 1960 to 1990 MHz, as shown in FIG. 10.

As mentioned above, in accordance with the switching of the two bands of high and low bands in the transmitting side circuit 25, the voltage is controlled so that the passing frequency of the receiving side circuit 26 is decreased when selecting the low-frequency passing band as the transmitting band, and the passing frequency of the receiving side circuit 26 is increased when selecting the high-frequency passing band as the transmitting band. This makes it possible to increase the separation to 50 MHz between the transmitting frequency band of the transmitting side circuit 25 and the receiving frequency band of the receiving side circuit 26, and the inserting loss also can be suppressed to a low level.

Figure 5:
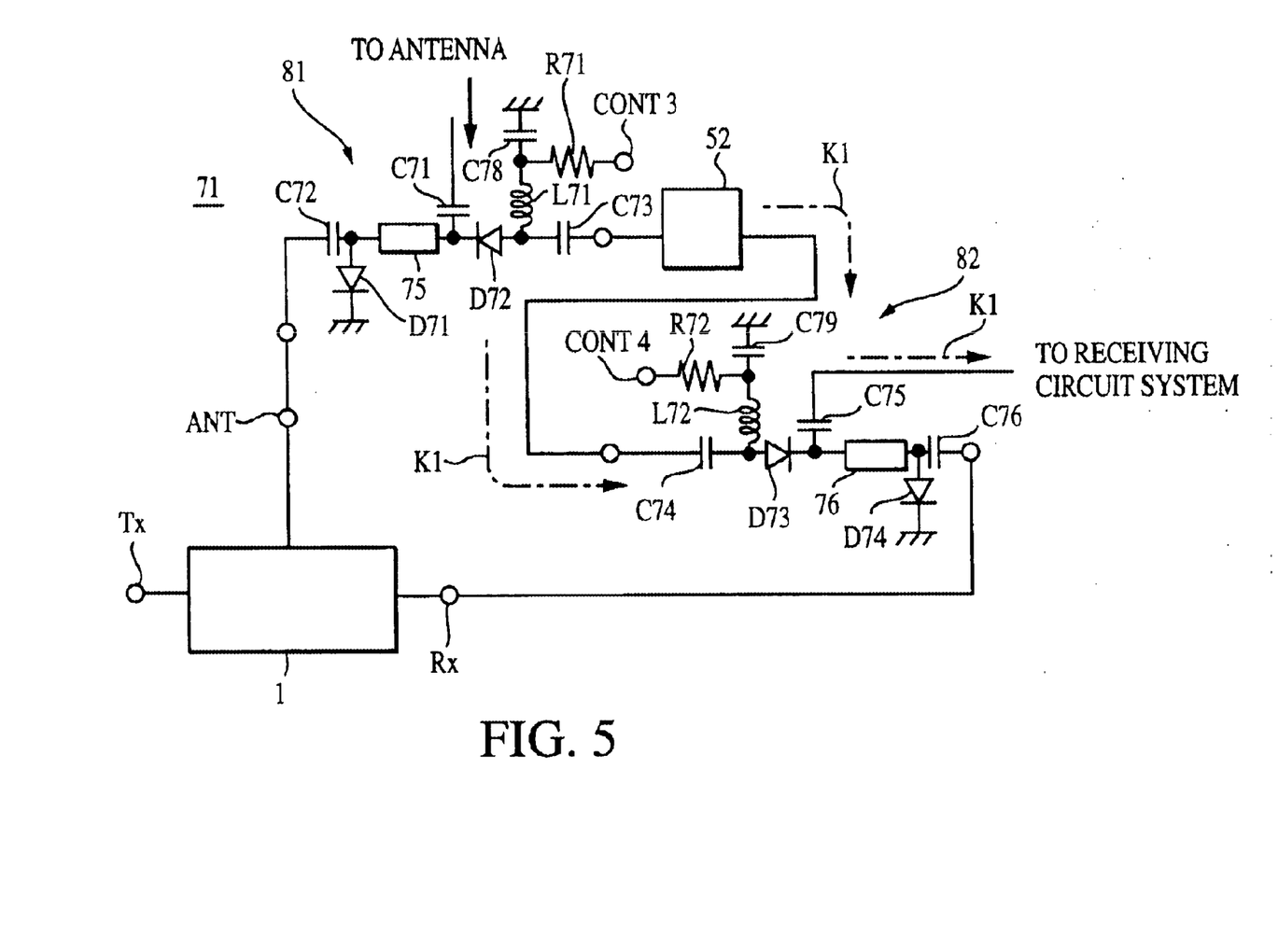
FIG. 5 is an electric circuit diagram showing a second embodiment of a high-frequency circuit apparatus according to the present invention.
Figure 6:
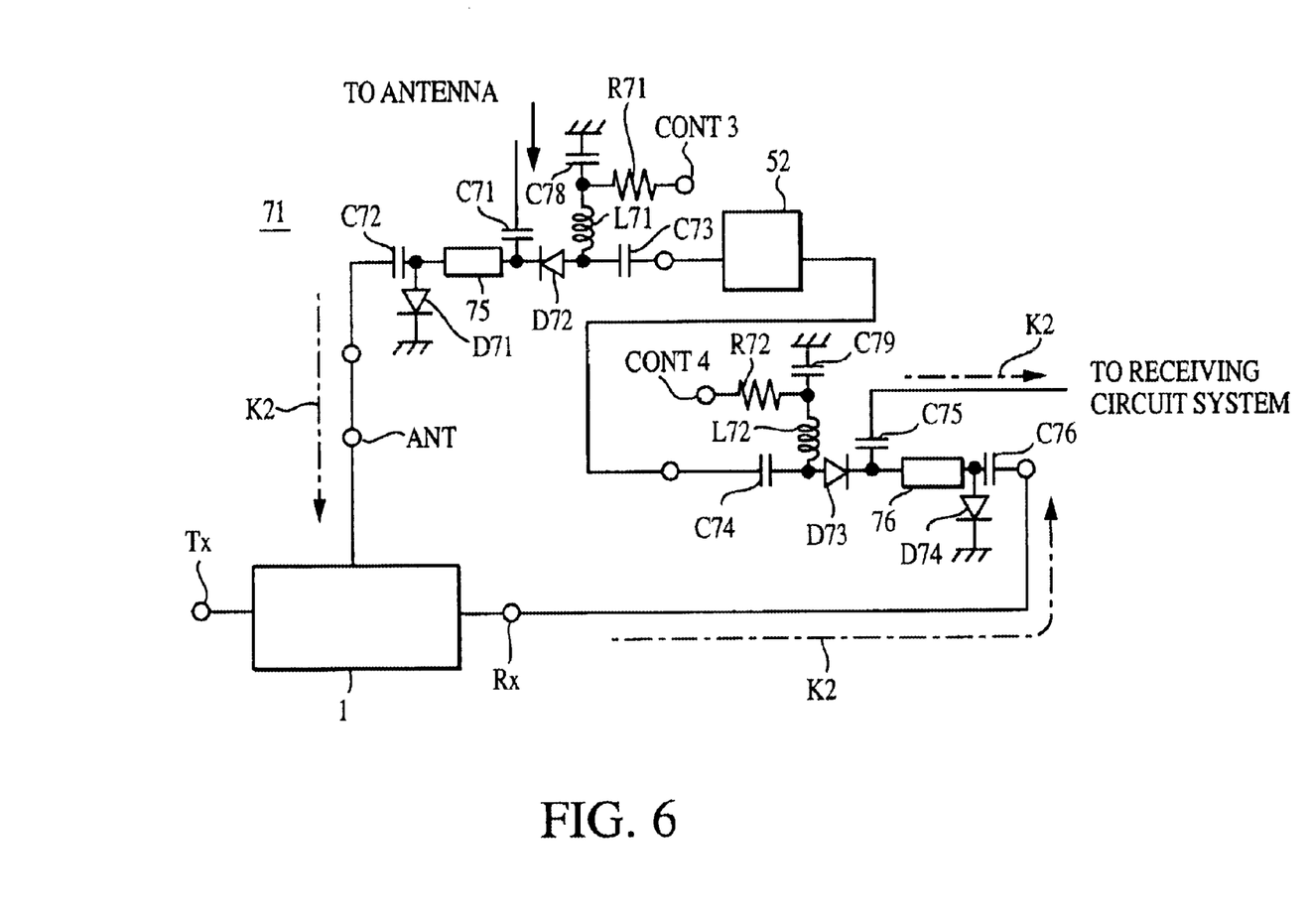
FIG. 6 is an electric circuit diagram showing the operation of the high-frequency circuit apparatus shown in FIG. 5.

[Second embodiment; FIG. 5 and FIG. 6]

FIG. 5 shows another embodiment of the high frequency circuit apparatus according to the present invention. A high-frequency circuit apparatus 71 uses PIN diode switches 81 and 82 as change-over switches.

The PIN diode switch 81 has: a transmitting line path 75; and PIN diodes D71 and D72. The anode of the PIN diode D71 is electrically connected to one end portion on the antenna duplexer 1 side of the transmitting line path 75, and the cathode is connected to the ground. On the other hand, the cathode of the PIN diode D72 is electrically connected to one end portion on the filter 52 for reception of the transmitting line path 75, and the anode is electrically connected to a voltage control terminal CONT3 via a choke coil L71, a resistor R71 for supplying the control voltage, and a capacitor C78. The antenna is electrically connected to an intermediate connecting point between the transmitting line path 75 and the PIN diode D72 by way of a coupling capacitor C71. The antenna terminal ANT of the antenna duplexer 1 is electrically connected to the anode of the PIN diode D71 by way of a coupling capacitor 72. The filter 52 for reception is electrically connected to the anode of the PIN diode D72 by way of a coupling capacitor 73.

The PIN diode switch 82 has: a transmitting line path 76; and PIN diodes D73 and D74. The cathode of the PIN diode D73 is electrically connected to one end portion on the filter 52 for reception of the transmitting line path 76, and the anode of the PIN diode D73 is electrically connected to a voltage control terminal CONT4 via a choke coil L72, a resistor 72 for supplying a control voltage, and a capacitor C79. On the contrary, the anode of the PIN diode D74 is electrically connected to one end portion on the antenna duplexer 1 of the transmitting line path 76, and the cathode of the PIN diode D74 is connected to one ground. The receiving circuit system is electrically connected to an intermediate connecting point between the transmitting line path 76 and the PIN diode D73 by way of a coupling capacitor C75. The filter 52 for reception is electrically connected to the anode of the PIN diode D73 by way of a coupling capacitor C74. The receiving terminal Rx of the antenna duplexer 1 is electrically connected to the anode of the PIN diode D74 by way of a coupling capacitor C76.

The next description turns to an operation and an advantage of the high-frequency circuit apparatus 71 with the above-stated construction.

It is assumed that the high-frequency circuit apparatus 71 waits for a receiving wave at a channel frequency band which requires supplying a consumption current to the antenna duplexer 1 of the frequency variable type, and waits for the receiving wave at the LOW channel (1930 to 1960 MHz), temporarily, in case of the PCS system. In this case, the PIN diodes D71 to D74 are turned on by applying the positive voltage as a control voltage to the voltage control terminals CONT3 and CONT4 of the PIN diode switches 81 and 82, as shown in FIG. 5. As a result, the PIN diode switches 81 and 82 are switched to the filter 52 side, and the receiving wave received through the antenna passes through the filter 52 for reception, not through the antenna duplexer 1, as shown by an arrow K1. In this case, the consumption current to turn on the PIN diodes D71 to D74 is equal to about 1 mA for the PIN diode switches 81 and 82, namely, the total is about 2 mA. By contrast, since the receiving side circuit 26 of the filter 1 of the frequency variable type is a band pass filter having three stages, the consumption current to turn on the PIN diodes D4 to D6 is equal to about 1 mA, respectively, namely, the total is about 3 mA. Therefore, the high frequency circuit apparatus 71 using the PIN diode switches 81 and 82 has a smaller amount of consumption current for receiving wave standby mode.

On the other hand, it is assumed that the high-frequency circuit apparatus 71 waits for the receiving wave at a channel frequency band at which no consumption current is supplied to the antenna duplexer 1 of the frequency variable type, and waits for the receiving wave at the HIGH channel (1960 to 1990 MHz) in case of the PCS system. In this case, the PIN diodes D71 to M D74 are turned off by setting the control voltage to 0V so as not to apply the voltage to the voltage control terminals CONT3 and CONT4 of the PIN diode switches 81 and 82, as shown in FIG. 6. As a result, the PIN diode switches 81 and 82 are switched to the antenna duplexer 1 side, and the receiving wave received through the antenna passes through the antenna duplexer 1, as shown by an arrow K2. Since no consumption current flows to the antenna duplexer 1, it is possible to suppress the amount of consumption current for receiving wave standby mode. It is noted that the PIN diode switches 81 and 82 are always set to a mode (shown in FIG. 6) to be switched to the antenna duplexer 1 during communication, and the antenna duplexer 1 operates in accordance with a high attenuation amount and a high power.

Figure 7:
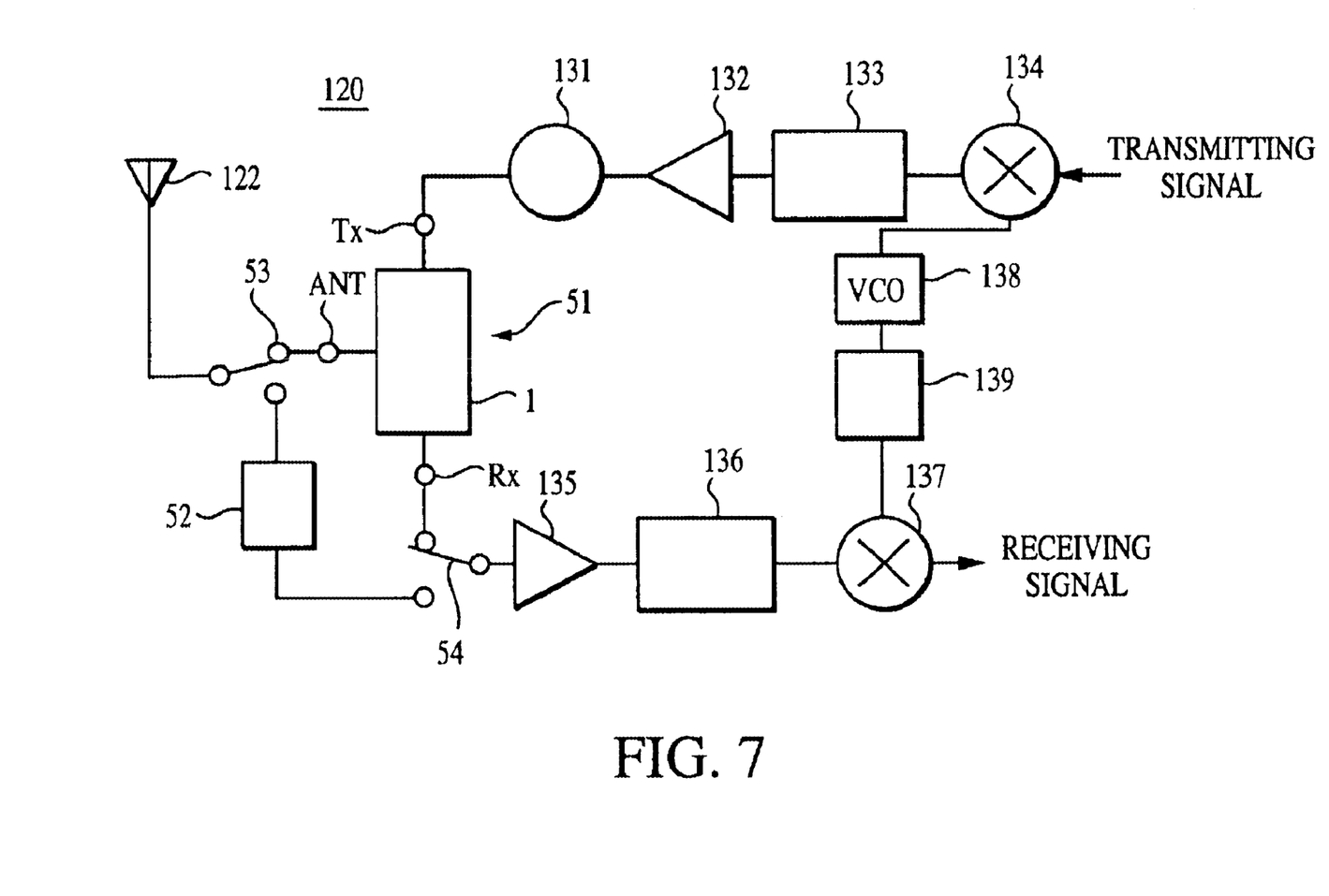
FIG. 7 is a block diagram showing one embodiment of a communication apparatus according to the present invention.

[Third embodiment; FIG. 7]

The description turns to a third embodiment in which a cellular phone is exemplified as a communication apparatus according to the present invention.

FIG. 7 is a block diagram showing an RF portion of a cellular phone 120. Referring to FIG. 7, reference numeral 122 denotes an antenna element; 51 the high-frequency circuit apparatus of the first embodiment 131 an isolcator on a transmitting side; 132 an amplifier on the transmitting side; 133 a band pass fitter for stage gap on the transmitting side; 134 a mixer on the transmitting side; 135 an amplifier on a receiving side; 136 a band pass filter for stage gap on the receiving side; 137 a mixer on the receiving side; 138 a voltage control oscillator (VCO); and 139 a band pass filter for local.

The high-frequency circuit apparatus 71 of the second embodiment can be used in replacement with the high-frequency circuit apparatus 51. The high-frequency circuit apparatuses 51 and 71 are mounted, thereby enabling the implementation of a cellular phone which has a small amount of consumption current for receiving wave standby mode and a small loss on the receiving side circuit.

Incidentally, the high-frequency circuit apparatus and the communication apparatus according to the present invention are not limited to the aforementioned embodiments, but can be modified variously within the range of the essence.

As discussed above, according to the present invention, obviously, when the apparatus enters the standby mode of the receiving wave at the channel frequency band which requires supplying the consumption current to the antenna duplexer, the antenna duplexer is switched to the filter from the antenna duplexer by the first and second change-over switches, and thus the receiving wave is allowed to pass through the filter, not through the antenna duplexer. Accordingly, it is unnecessary to supply the consumption current to the antenna duplexer, and the amount of consumption current for receiving wave standby mode can be decreased. Further, the filter is electrically opened to the antenna duplexer of the frequency variable type, so that it is possible to suppress the loss to insert the filter to a low level. This makes it possible to provide a communication apparatus which has a small amount of consumption power for receiving wave standby mode and a small loss of the receiving side circuit.

As the first and second change-over switches, the GaAs switch and the PIN diode switch are used, so that the switch size is miniaturized and the switching operation can be conducted at a high speed. As for the filter, it is exemplified that the surface acoustic wave filter, coil, and capacitor are combined and the thus-constructed filter is used. Accordingly, the filter can be miniaturized.

While the invention has been particularly shown and described with reference to preferred embodiments thereof, it will be understood by those skilled in the art that the forgoing and other changes in form and details may be made therein without departing from the spirit of the invention.

What is claimed is:

1. A high-frequency circuit apparatus comprising:

an antenna duplexer of a frequency variable type having a first external terminal, a second external terminal, and an antenna terminal;

a first change-over switch which receives an input signal and is adapted to switch said input signal from said antenna terminal to said duplexer or a filter and visa versa;

a second change-over switch which is electrically connected to said second external terminal and;

said filter being electrically connected across said first change-over switch and said second change-over switch, wherein said first external terminal is a transmitting terminal, said second external terminal is a receiving terminal, and said filter is a filter for reception.

2. The high-frequency circuit apparatus according to claim 1, wherein at least one of said first change-over switch and said second change-over switch is a GaAs switch.

3. The high-frequency circuit apparatus according to claim 1, wherein at least one of said first change-over switch and second change-over switch is a PIN diode switch.

4. The high frequency circuit apparatus according to claim 1, wherein said filter is a surface acoustic wave filter.

5. The high-frequency circuit apparatus according to claim 1, wherein said filter is constructed by combining a coil and a capacitor.

6. A communication apparatus comprising a high-frequency circuit connected to a high-frequency apparatus according to claim 1.

* * * * *